United States Patent [19]

Wen

[11] Patent Number: 4,835,664
[45] Date of Patent: May 30, 1989

[54] SOLAR LIGHTING DEVICE FOR GARDEN OR DRIVEWAY

[76] Inventor: Hung-Sheng Wen, 3F, 5, Lane 14, Yung Kang Street, Taipei 10621, Taiwan

[21] Appl. No.: 198,437

[22] Filed: May 25, 1988

[51] Int. Cl.$^4$ .............................................. F21L 11/00
[52] U.S. Cl. ................................. 362/183; 136/291; 362/190; 362/191; 362/431
[58] Field of Search ............... 362/152, 183, 157, 186, 362/190, 191, 197, 199, 300, 347, 431, 457; 136/291

[56] References Cited

U.S. PATENT DOCUMENTS

| | | | |
|---|---|---|---|
| 1,291,483 | 1/1919 | Grether | 362/197 |
| 3,263,069 | 7/1966 | Krucki et al. | 362/431 |
| 3,270,480 | 9/1966 | Beecker | 362/431 |
| 4,009,535 | 3/1977 | Stock | 362/183 |
| 4,152,756 | 5/1979 | Wrege et al. | 362/152 |
| 4,200,904 | 4/1980 | Doan | 362/183 |
| 4,281,369 | 7/1981 | Batte | 362/183 |
| 4,319,310 | 3/1982 | Kingsley | 136/291 |
| 4,410,930 | 10/1983 | Yachabach | 362/183 |
| 4,486,820 | 12/1984 | Baba et al. | 362/157 |
| 4,517,630 | 5/1985 | Dieffenbach et al. | 362/347 |

Primary Examiner—Ira S. Lazarus
Assistant Examiner—David G. Messer
Attorney, Agent, or Firm—Cushman, Darby & Cushman

[57] ABSTRACT

A solar lighting device for garden or driveway according to this invention transforms solar energy into electric energy using a solar energy absorbing plate and stores the electric energy into an electric battery. A light sensor turns on the lighting circuit during dark hours. The solar lighting device of this invention comprises a solar energy absorbing plate, a shell, an electric battery, a focusing reflector, a lens, and a set of connecting links. The shell has two openings, one opening is inclined with respect to the shell and adapted for the insertion of the solar energy absorbing plate. The other opening is for inserting the lens. The shell holds an electric battery, a board, and a focusing reflector. Also the solar energy absorbing plate engages with the inclined opening of the shell using lugs formed on the rim of the plate, and the frame of the lens is pivotally mounted on the other opening of the shell.

34 Claims, 5 Drawing Sheets

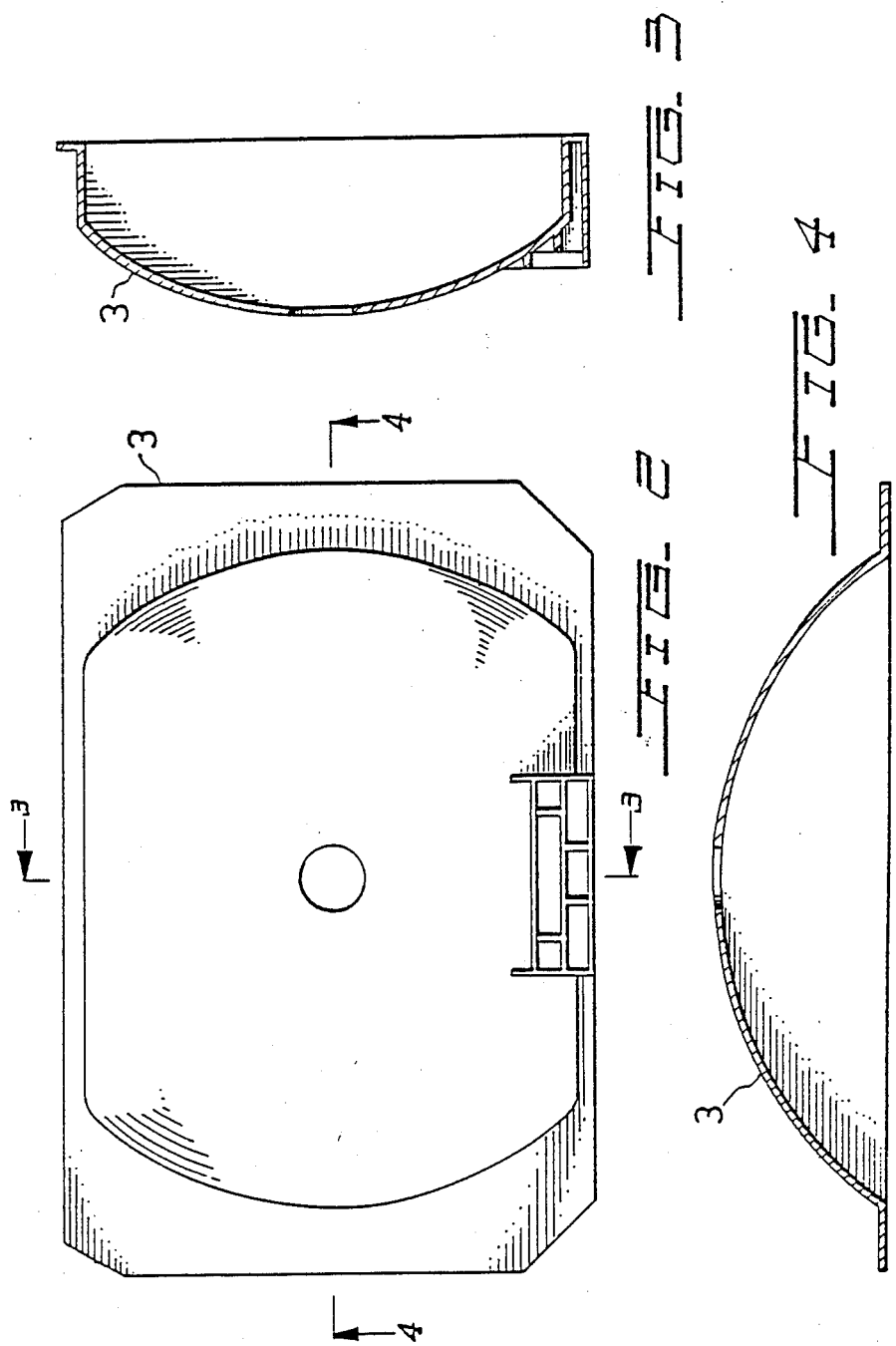

SOLAR LIGHTING DEVICE FOR GARDEN OR DRIVEWAY

SUMMARY OF THE INVENTION

This invention relates to a solar lighting device for garden or driveway which transforms sunlight into electric energy and stores electric energy in an electric battery by means of solar cells of a solar energy absorbing plate. The solar lighting device incorporates with a sensor and circuits adapted to the switching off of lighting circuit, that is lighting bulb being in off state during the day, or to the turning on the lighting circuit and the lighting bulb being in on state, during the night to lighten garden or driveway.

The solar lighting device according to this invention comprises a solar energy absorbing plate, a shell, an electric battery, a focusing reflector, a lens, a plurality of slots formed in the bottom of the shell, and a set of links. There provide a plurality of solar cells on the solar energy absorbing plate for transforming solar energy into electric energy. All the circuits are divided into two parts, that is, an electric charging circuit and a lighting circuit. During the day, the electric charging circuit is effected to store electric energy into the electric battery, and during the night the lighting circuit is actuated by the sensor which turns off the lighting circuit to avoid the discharge of the electric energy. If switching between "ON" state and "OFF" state is necessary, then a switch is provided, which incorporates with relevant circuits to turn on the lighting bulb during the night, when at its "ON" state, and to turn off the lighting bulb during the day, when at its "OFF" state. In this way, the object of energy saving can be achieved.

One characteristic of this invention is in that a plurality of lugs are provided on the rim of solar energy absorbing plate inserting such that the lugs can be inserted into the corresponding slots formed in the rim of an inclined opening of the shell. By this arrangement, a solar energy absorbing plate frame, a rubber seal, and a solar energy absorbing plate can be secured onto the rim of the inclined opening of the shell. The replacement of the solar energy absorbing plate is very easy, by pushing the lugs outward from the inside of the shell, the solar energy absorbing plate frames will be driven to disengage with the rim of the inclined opening immediately, and thus the replacement of the solar energy absorbing plate can be accomplished, if any breakage of the solar energy absorbing plate occurs by accidence.

Further characteristic of this invention is in that pin holes are provided in both side of the frame of the lens for being inserted by two pivotal pins, by which the frame of the lens can be pivotally mounted on the shell. By this arrangement, the frame of the lens can be rotated to open. Screwing out the screws secured on the bottom of the frame of the lens, and rotating the frame open, a new lens can be replaced, if necessary.

Further characteristic of this invention is in that an engaging slot is provided on the connection portion protruding from the central portion of the bottom of the shell, which slot can engage with a fixer, a connecting link, or a supporting frame, in match with the environments or usage. By this arrangement, an utmost effect of mounting can be obtained.

Further characteristic of this invention is in that when a connecting link is inserted into the slot of the connection portion, the lighting angle of the lighting bulb according to this invention can be adjusted, and the angle of solar energy absorbing plate can also be adjusted. By this arrangement, an utmost effect of lighting can be obtained.

BRIEF DESCRIPTION OF THE DRAWINGS

FIG. 2 is a rear view of a focusing reflector 3;

FIG. 3 is a transverse sectional view taken along a plane corresponding to line 3—3 of FIG. 2;

FIG. 4 is a transverse sectional view taken along a plane corresponding to line 4—4 of FIG. 2;

DETAILED DESCRIPTION OF THE INVENTION

Figure 1:
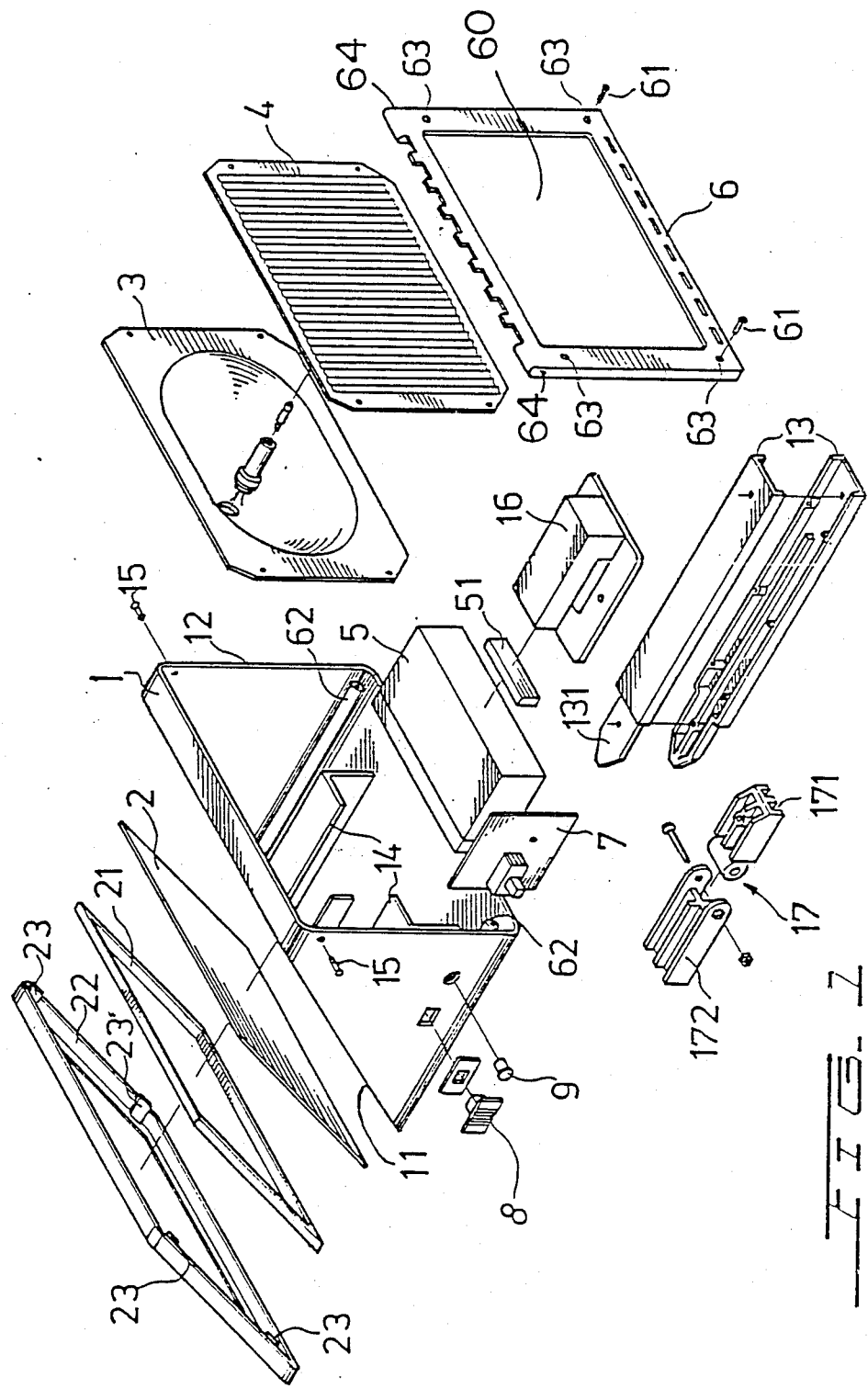
FIG. 1 is an exploded perspective view of the solar lighting device of the present invention.

As shown in FIG. 1, the lighting device according to this invention comprises a shell 1, a solar energy absorbing plate 2, a focusing relfector 3, a lens 4, an electric battery 5, and a lens frame 6. The shell 1 is shaped like a rectangular tube having two opposite openings 11, 12, one of which is inclined. A recess (not shown) is formed along the periphery of said inclined opening 11 for receiving said solar energy absorbing plate 2 and a rubber seal 21 upon which said absoring plate frame 22 is provided. The plate frame 22 is provided with a plurality of lugs 23 which insert into the corresponding slots (not shown) formed in the rim of the inclined opening 11 of the shell 1, so that the absorbing plate frame 22, the rubber seal 21 and the solar energy absorbing plate 2 can be secured onto the rim of the inclined opening 11. The replacement of the solar energy absorbing plate 2 is very easy, by pushing the lugs 23 outward from the inside of the shell 1, the solar energy absorbing frame 22 will be driven to disengage with the rim of the inclined opening 11, and thus the replacement of the solar energy absorbing plate 2 can be accomplished, if any breakage of the solar energy absorbing plate 2 occurs.

The other opening 12 of the shell 1 is adapted to a focusing reflector 3, a lens 4, and a lens frame 6. Holes are provided in both of the corners of the focusing reflector 3 and the lens 4, and the focusing reflector 3 and the lens 4 are secured to the rim of the opening 12 by means of pins 63, formed integrally on the inner side of the lens frame 6. The reflection surface of the focusing reflector 3 is shaped like a paraboloid in which the rear view thereof is shown in FIG. 2, and the sectional views thereof are shown in FIG. 3 and FIG. 4, respectively.

An opening 60 is formed at the central portion of the lens frame 6. Light emitted from the lighting bulb (not shown) passes through the lens 4, and subsequently through the opening 60 of the lens frame 6. The lateral edge of lens frame 6 is provided with two holes 64 on both of the exterior sides of upper portion thereof, two pegs 15 are respectively inserted from the exterior of the shell 1, via the shell 1, into said holes 64 to pivotally secure the lens frame 6 on the shell 1. Furthermore, said holes 64 are provided on the lower portion of the lens frame 6, through which holes, two screws 61 are inserted and secured within the screwed holes 62 formed in the shell 1. By this arrangement, the lens frame can be opened by lifting it to rotate about the pegs 15. By unscrewing the screws 61 from the holes 62, a new lens can be replaced.

As shown in FIG. 1, a compartment is provided within the shell 1 for positioning an electric battery 5. A fastening block 51 is provided between the focusing reflector 3 and the electric battery 5. By this arrangement, the electric battery 5 can be positioned after the positioning of the focusing reflector 3. In addition, a board 7 is provided within the shell 1, on which circuits for electric charging and lighting are assembled, the circuits for such purposes are known to this art and will not be described herein. The shell 1 is provided with two through holes adjacent to the board 7, one of the through holes is provided for the recession of a switch 8, the other is adapted for a sensor 9. Both of the switch 8 and the sensor 9 are protruding outside the shell 1. The switch 8 enables the "ON" or "OFF" state of the lighting circuit, and the sensor 9 senses the intensity of sunlight to actuate the electric charging circuit.

Figure 5:
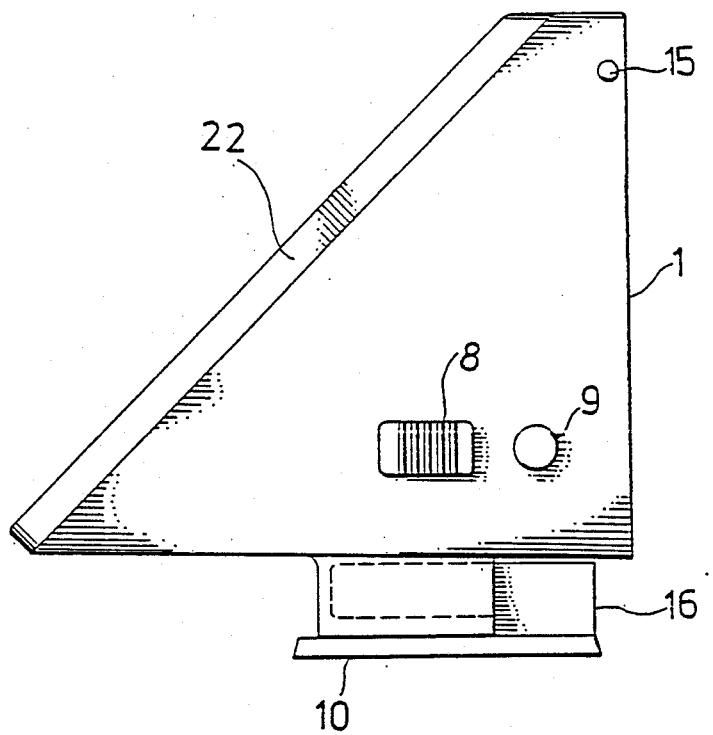
FIG. 5 is a view showing an embodiment of inserting a connection portion 10 of the shell 1 into a fixer 16.
Figure 6:
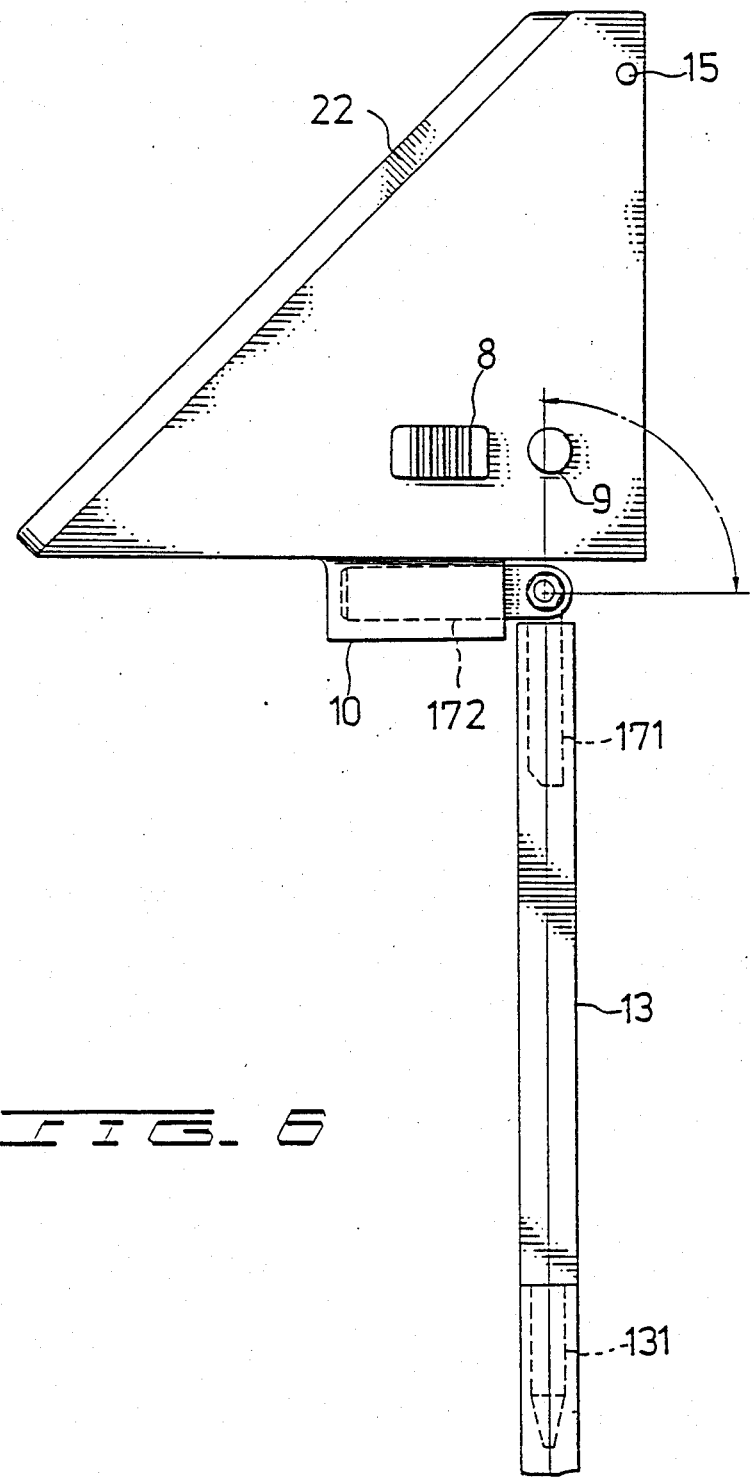
FIG. 6 is a view showing another embodiment of connecting the connection portion 10 of the shell 1 with a frame 13.
Figure 7:
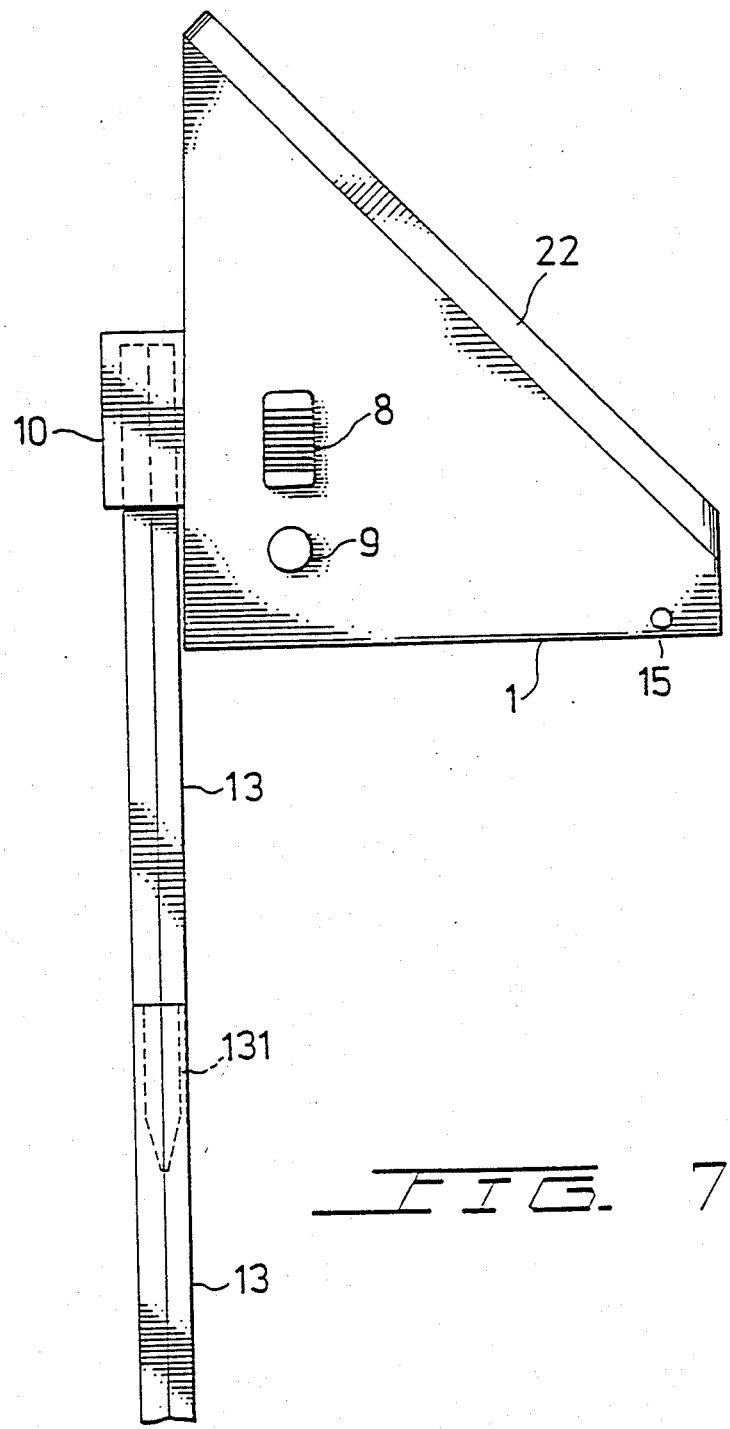
FIG. 7 is a view showing a further embodiment of connecting the connection portion 10 of the shell 1 with a plurality of frames 13.

As shown in FIG. 5, FIG. 6 and FIG. 7, the shell 1 is provided with a connection portion 10 protruding from the central portion of the bottom of the shell 1, and an engaging slot (not shown) is provided on the connection portion 10. The slot can engage with various fixing members, for example, by inserting a fixer 16 (as shown in FIG. 5) into the slot and securing the fixer 16 by screwing to a wall of a building, the lighting device can be secured on the wall of the building. Furthermore, by inserting the insert 172 of the connecting links 17 (as shown in FIG. 6) into the slot and inserting the extending portion 171 into the frame 13 which can be extended, the angle of solar energy absorbing plate 2 or the lighting bulb can be adjusted. As shown in FIG. 1, one end portion of the frame 13 is flat, the other end portion of the frame 13 is a inserting portion 131 in which the thickness thereof is smaller than that of the former. By this arrangement, the frame 13 can be extended by inserting the thinner end portions thereof into the flat portions, and finally insert the thinner end portion into earth to accomplish the mounting of the lighting device according to this invention.

It is understood that the preferred embodiment described in the present disclosure is exemplary rather than limiting. Changes in the construction of the invention may be made without departing from the spirt and the scope of the invention as hereinafter claimed.

What is claimed:

1. A solar lighting device for a garden or driveway comprising:
   a shell having an inclined opening that is inclined with respect to a base of the shell and an orthogonal opening that is orthogonal with respect to the base of the shell so that sunlight impinges upon the shell through said inclined opening and is emitted from said orthogonal opening;
   a solar energy absorbing plate having a plurality of solar cells mounted on the recess of a rim of the inclined opening;
   an electric battery mounted within the shell for storing electric energy transformed from solar energy by said solar cells;
   a pivotable lens frame attached to a rim of said orthogonal opening, said pivotable lens frame pivotable about pegs insertable through said shell;
   a focusing reflector mounted on said pivotable lens frame for focusing and reflecting light emitted from a lighting bulb;
   a lens mounted between said focusing reflector and said pivotable lens frame;
   means disposed within said shell for charging said electric battery using said electric energy transformed from said solar cells;
   means disposed within said shell for lighting said lighting bulb using said stored electric energy; and
   a sensor being inserted into a hole formed on said shell and protruding outside of said shell for sensing the intensity of sunlight to actuate said electric charging means.

2. A solar lighting device of claim 1 further including a connection means disposed on a central portion of the base of the shell, and a connecting slot is formed in the connection means.

3. A solar lighting device of claim 2, wherein the connecting slot is provided for insertion of a fixing member having a bottom plate secured to a supporting structure.

4. A solar lighting device of claim 2, wherein the connecting slot is provided for insertion of a first insert portion of a connecting link, said connecting link also having a second insert portion inserted into a slot of an extending frame, and a pivotable connection between said first insert portion and said second insert portion to enable the angle of sunlight incident upon the shell or angle of light emitted from the shell to be adjusted.

5. A solar lighting device as claimed in claim 4 wherein a hole is provided on the side of the shell adjacent to the circuit board for accommodating a switch protruding outside of the shell, the switch being capable of switching the lighting means to one of an on state and an off state.

6. A solar lighting device of claim 2, wherein the connecting slot engages a frame means at an inserting portion disposed on one end and has an opening at another end to receive an inserting portion of a second frame means so that a plurality of frames of similar construction can be connected in series with the inserting portions inserted into the opening at the another end.

7. A solar lighting device as claimed in claim 6 wherein a hole is provided on the side of the shell adjacent to the circuit board for accommodating a switch protruding outside of the shell, the switch being capable of switching the lighting means to one of an on state and an off state.

8. A solar lighting device of claim 1, wherein two holes are provided on the lower portion of the lens frame for securing the lens frame on the shell by screws.

9. A solar lighting device of claim 8 further including a connection means disposed on a central portion of the base of the shell, and a connecting slot is formed in the connection means.

10. A solar lighting device of claim 9, wherein the connecting slot is provided for insertion of a fixing member having a bottom plate secured to a supporting structure.

11. A solar lighting device as claimed in claim 10 wherein a hole is provided on the side of the shell adjacent to the circuit board for accommodating a switch protruding outside of the shell, the switch being capable of switching the lighting means to one of an on state and an off state.

12. A solar lighting device of claim 9, wherein the connecting slot is provided for insertion of a first insert portion of a connecting link, said connecting link also having a second insert portion inserted into a slot of an extending frame, and a pivotable connection between said first insert portion and said second insert portion to enable the angle of sunlight incident upon the shell or angle of light emitted from the shell to be adjusted.

13. A solar lighting device as claimed in claim 12 wherein a hole is provided on the side of the shell adjacent to the circuit board for accommodating a switch protruding outside of the shell, the switch being capable of switching the lighting means to one of an on state and an off state.

14. A solar lighting device of claim 9, wherein the connecting slot engages a frame means at an inserting portion disposed on one end and has an opening at another end to receive an inserting portion of a second frame means so that a plurality of frames of similar construction can be connected in series with the inserting portions inserted into the opening at the another end.

15. A solar lighting device as claimed in claim 14 wherein a hole is provided on the side of the shell adjacent to the circuit board for accommodating a switch protruding outside of the shell, the switch being capable of switching the lighting means to one of an on state and an off state.

16. A solar lighting device of claim 8 wherein said solar energy absorbing plate is mounted on the rim of the inclined opening with a plate frame having an opening formed in the central portion that receives said solar energy absorbing plate, and a plurality of lugs provided on the inner rim for engaging with a plurality of corresponding slots formed on the inner rim of the inclined opening of the shell.

17. A solar lighting device of claim 16, wherein the reflecting surface of the focusing reflector is shaped like a paraboloid.

18. A solar lighting device of claim 17 further including a connection means disposed on a central portion of the base of the shell, and a connecting slot is formed in the connection means.

19. A solar lighting device of claim 18, wherein the connecting slot is provided for insertion of a fixing member having a bottom plate secured to a supporting structure.

20. A solar lighting device as claimed in claim 19 wherein a hole is provided on the side of the shell adjacent to the circuit board for accommodating a switch protruding outside of the shell, the switch being capable of switching the lighting means to one of an on state and an off state.

21. A solar lighting device of claim 18, wherein the connecting slot is provided for insertion of a first insert portion of a connecting link, said connecting link also having a second insert portion inserted into a slot of an extending frame, and a pivotable connection between said first insert portion and said second insert portion to enable the angle of sunlight incident upon the shell or angle of light emitted from the shell to be adjusted.

22. A solar lighting device as claimed in claim 21 wherein a hole is provided on the side of the shell adjacent to the circuit board for accommodating a switch protruding outside of the shell, the switch being capable of switching the lighting means to one of an on state and an off state.

23. A solar lighting device of claim 18, wherein the connecting slot engages a frame means at an inserting portion disposed on one end and has an opening at another end to receive an inserting portion of a second frame means so that a plurality of frames of similar construction can be connected in series with the inserting portions inserted into the opening at the another end.

24. A solar lighting device as claimed in claim 23 wherein a hole is provided on the side of the shell adjacent to the circuit board for accommodating a switch protruding outside of the shell, the switch being capable of switching the lighting means to one of an on state and an off state.

25. A solar lighting device of claim 1 wherein said solar energy absorbing plate is mounted on the rim of the inclined opening with a plate frame having an opening formed in the central portion that receives said solar energy absorbing plate, and a plurality of lugs provided on the inner rim for engaging with a plurality of corresponding slots formed on the inner rim of the inclined opening of the shell.

26. A solar lighting device of claim 25, wherein the reflecting surface of the focusing reflector is shaped like a paraboloid.

27. A solar lighting device of claim 26 further including a connection means disposed on a central portion of the base of the shell, and a connecting slot is formed in the connection means.

28. A solar lighting device of claim 27, wherein the connecting slot is provided for insertion of a fixing member having a bottom plate secured to a supporting structure.

29. A solar lighting device as claimed in claim 28 wherein a hole is provided on the side of the shell adjacent to the circuit board for accommodating a switch protruding outside of the shell, the switch being capable of switching the lighting means to one of an on state and an off state.

30. A solar lighting device of claim 27, wherein the connecting slot is provided for insertion of a first insert portion of a connecting link, said connecting link also having a second insert portion inserted into a slot of an extending frame, and a pivotable connection between said first insert portion and said second insert portion to enable the angle of sunlight incident upon the shell or angle of light emitted from the shell to be adjusted.

31. A solar lighting device as claimed in claim 30 wherein a hole is provided on the side of the shell adjacent to the circuit board for accommodating a switch protruding outside of the shell, the switch being capable of switching the lighting means to one of an on state and an off state.

32. A solar lighting device of claim 27, wherein the connecting slot engages a frame means at an inserting portion disposed on one end and has an opening at another end to receive an inserting portion of a second frame means so that a plurality of frames of similar construction can be connected in series with the inserting portions inserted into the opening at the another end.

33. A solar lighting device as claimed in claim 32 wherein a hole is provided on the side of the shell adjacent to the circuit board for accommodating a switch protruding outside of the shell, the switch being capable of switching the lighting means to one of an on state and an off state.

34. A solar lighting device as claimed in claim 1 wherein a hole is provided on the side of the shell adjacent to the circuit board for accommodating a switch protruding outside of the shell, the switch being capable of switching the lighting means to one of an on state and an off state.

* * * * *